(12) United States Patent
Yamada

(10) Patent No.: US 6,995,780 B1
(45) Date of Patent: Feb. 7, 2006

(54) PICTURE CONVERT APPARATUS (75) Inventor: Toru Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/492,462

(22) Filed: Jan. 27, 2000

(30) Foreign Application Priority Data

Jan. 27, 1999 (JP) ................................ 11-018719

(51) Int. Cl.
G09G 1/502 (2006.01)

(52) U.S. Cl. ...................... 345/698; 345/699; 348/445

(58) Field of Classification Search ................ 358/451, 358/528, 529; 345/204, 89, 90, 100, 698, 345/699, 468, 472.2, 472.3; 348/445, 446, 348/556, 558, 559
See application file for complete search history.

(56) References Cited

U.S. PATENT DOCUMENTS

| | | | | |
|---|---|---|---|---|
| 4,682,243 A | * | 7/1987 | Hatayama ................... | 358/451 |
| 4,930,021 A | * | 5/1990 | Okada ........................ | 358/451 |
| 4,953,025 A | * | 8/1990 | Saitoh et al. ............... | 348/445 |
| 5,289,293 A | * | 2/1994 | Kato et al. .................. | 358/3.07 |
| 5,323,235 A | * | 6/1994 | Tonomura et al. ........... | 348/445 |
| 5,631,710 A | * | 5/1997 | Kamogawa et al. .......... | 348/555 |
| 5,739,867 A | * | 4/1998 | Eglit .......................... | 348/581 |
| 5,754,707 A | * | 5/1998 | Knowlton ................... | 382/254 |
| 5,914,754 A | * | 6/1999 | Kori et al. ................... | 348/455 |
| 6,014,121 A | * | 1/2000 | Aratani et al. .............. | 345/89 |
| 6,226,040 B1 | * | 5/2001 | Kuo et al. ................... | 348/446 |
| 6,458,520 B2 | * | 10/2002 | Ishikawa et al. ............ | 430/434 |

* cited by examiner

*Primary Examiner*—Xiao Wu
*Assistant Examiner*—Abbas Abdulselam
(74) *Attorney, Agent, or Firm*—Foley & Lardner LLP (57) ABSTRACT

A picture convert apparatus of the present invention includes a first element which inputs a first picture data and produces a second picture data consisting of a first black area, a second black area and an area consisting of the reduced number of lines of the first picture; a second element which enlarges the second picture; and a third element which display the enlarged picture. A method of the present invention for converting a first picture data to a second picture data, includes: producing a first black area; reducing the line number of the first picture data to a predetermined line number; producing a second black area; forming the first black area, the reduced numbers of lines and the second black area to a frame; enlarging the frame; and displaying the enlarged frame on a display.

8 Claims, 8 Drawing Sheets

PICTURE CONVERT APPARATUS

BACKGROUND OF THE INVENTION

1. Field of the Invention

The present invention relates to an image display unit which displays a picture data with an aspect ratio of 16:9 by a letter box display, a system, and a method.

As a picture signal (picture data) contained in a High Definition Television (HDTV) and a Digital Versatile Disc (DVD) or the like, there is a picture data in which the ratio of width to height (aspect ratio) of the picture is 16:9. When an image with an aspect ratio of 16:9 is displayed on a display with an aspect ratio of 4:3 as it is, the image is vertically distorted.

2. Description of the Prior Art

As a conventional system of displaying a picture data (signal) with an aspect ratio of 16:9 on a display with an aspect ratio of 4:3, there are a pan scanning system and a letter box system. In the pan scanning system, both ends of a picture are cut off and the picture at the center is displayed with an aspect ratio of 4:3. In the letter box system, black frames are displayed at the upper and lower parts of a display frame, and between the upper and lower black frames, a picture data (signal) with an aspect ratio of 16:9 is displayed by being contracted.

Figure 8:
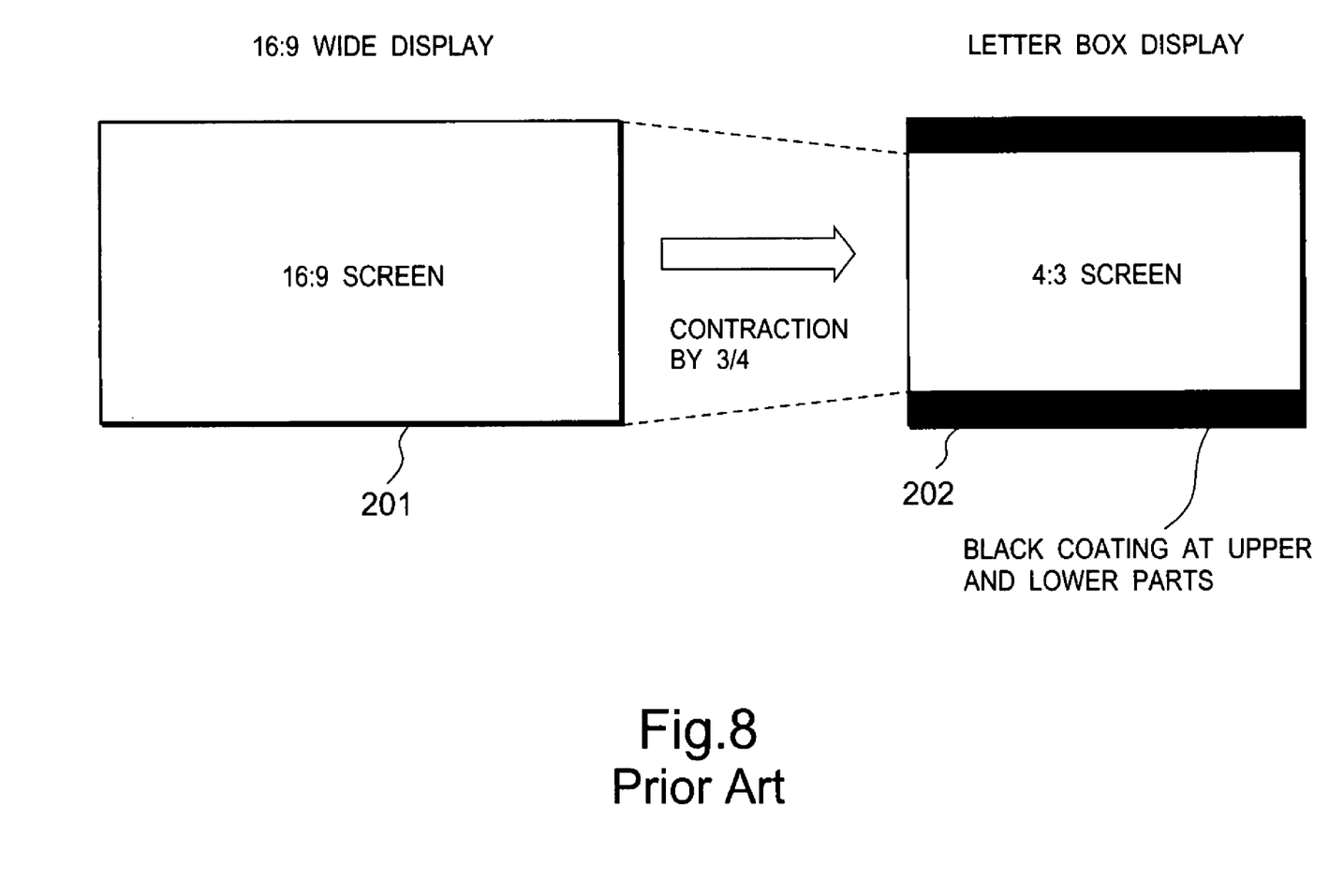
FIG. 8 is a drawing showing a conventional letter box display.

Referring to FIG. 8, a display method according to a conventional letter box system will be described.

In a conventional letter box display, black frames are coated (black data is transferred) at the upper and lower parts of a screen 202 with an aspect ratio of 4:3, and between the upper and lower black frames, a picture data (signal) with an aspect ratio of 16:9 which is vertically contracted (contraction by ¾) is displayed. Thus, in the conventional letter box system, from a picture data (signal) with an aspect ratio of 16:9, the data in the vertical direction is contracted by ¾ in size, and the display has been performed on a display unit together with the upper and lower black frames.

However, this method creates a problem. The reason is that when a central processing unit (CPU) performing the multiprocessing performs all processing, it takes a long time for the contraction processing.

Furthermore, this conventional letter box system produces a problem. The reason is that the contraction processing is performed for each frame, so that the throughput of the data may be increased and the load of the central processing unit (CPU) may be raised. Accordingly, when the speed of the processing such as a decoding processing by a software of an MPEG picture data is taken seriously, a high performance of the central processing unit (CPU) is required.

Furthermore, a problem is caused. The reason is that the scanning conversion processing becomes complex. In the case where an image of a picture data of the interlace scanning system (interlaced scanning) is displayed on a display unit of the sequential scanning such as a display unit of a PC, the scanning conversion processing is required. The vertical contraction by ¾ creates a difference in the number (of scanning lines) between a first (odd number) field and a second (even number) field.

SUMMARY OF THE INVENTION

It is an object of the present invention to provide an image display unit in which the load of a central processing unit (CPU) is small, a system, and a method. In the unit, system, and method, a picture data (picture signal) with an aspect ratio of 16:9 is displayed by the letter box display.

It is another object of the present invention to provide a high speed image display unit, a high speed image display system, and a high speed image display method. In the unit, system, and method, a picture data (picture signal) with an aspect ratio of 16:9 is displayed by the letter box display.

According to one aspect of the present invention, a picture convert apparatus is provided which includes: a first element which inputs a first picture data and produces a second picture data consisting of a first black area, a second black area and an area consisting of the reduced number of lines of the first picture; a second element which enlarges the second picture; and a third element which display the enlarged picture.

According to another aspect of the present invention, a picture convert apparatus is provided which includes: a first element which produces a first black area; a second element which reduces the line number of a picture data to a predetermined line number; a third element which produces a second black area; a fourth element which forms the first black area, the reduced numbers of lines and the second black area to a frame; a fifth element which enlarge the frame; and a sixth element which display the enlarged frame.

According to another aspect of the present invention, a method for converting a first picture data to a second picture data, is provided which includes: producing a first black area; reducing the line number of the first picture data to a predetermined line number; producing a second black area; forming the first black area, the reduced numbers of lines and the second black area to a frame; enlarging the frame; and displaying the enlarged frame on a display.

BRIEF DESCRIPTION OF THE DRAWINGS

Other features and advantages of the invention will be made more apparent by the following detailed description and the accompanying drawings, wherein.

In the drawings, the same reference numerals represent the same structural elements.

DETAILED DESCRIPTION OF THE PREFERRED EMBODIMENTS

A first embodiment of the present invention will be described in detail below.

Figure 1:
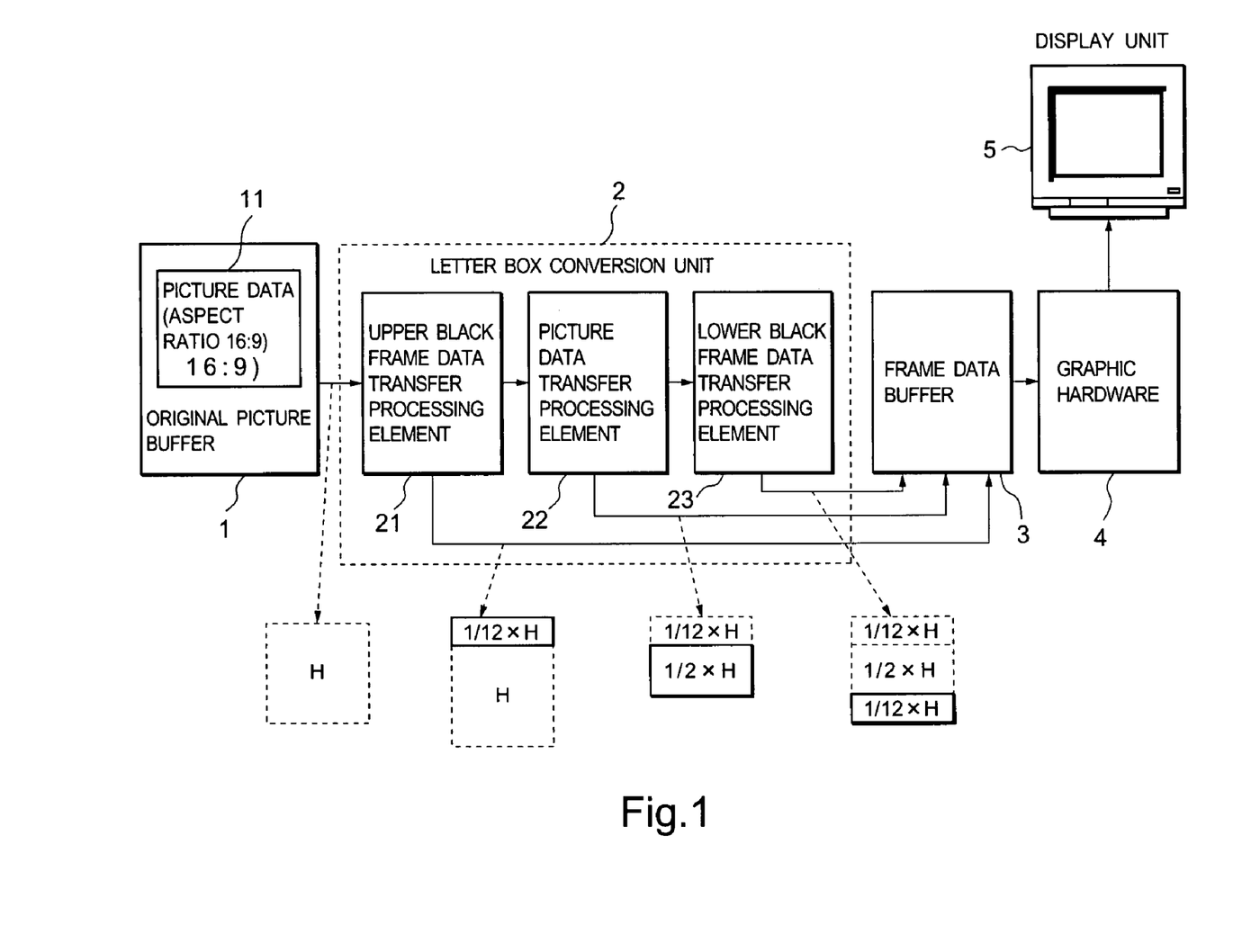
FIG. 1 is a block diagram of an embodiment of the present invention.

Referring to FIG. 1, an image display system of the present invention comprises an original picture buffer 1, a letter box conversion unit 2, a frame data buffer 3, a graphic hardware 4, and a display unit 5.

The original picture buffer 1 is a buffer for storing a picture data 11 with an aspect ratio of 16:9.

The letter box conversion unit 2 thins out by ½ the data in the vertical direction of the picture data 11 stored in the original picture buffer 1. The letter box conversion unit 2 comprises a central processing unit.

Next, the concrete configuration of the letter box conversion unit 2 will be described. In the following description, the number of lines of the picture data 11 with an aspect ratio of 16:9 is set to H (lines).

The letter box conversion unit 2 comprises an upper black frame data transfer processing element 21, a picture data transfer processing element 22, and a lower black frame data transfer processing element 23.

The upper black frame data transfer processing element 21 newly creates a black frame data of $1/12 \times H$ (lines) corresponding to the upper black frame of the letter box display from the picture data 11. The upper black frame data transfer processing element 21 transfers the created black frame data to the frame data buffer 3.

The picture data transfer processing element 22 thins out the number of lines of H (lines) of the picture data 11 by ½. The picture data transfer processing element 22 transfers the picture data of ½×H (lines) to the frame data buffer 3.

The lower black frame data transfer processing element 23 newly creates a black frame data of $1/12 \times H$ (lines) corresponding to the lower black frame of the letter box display. The lower black frame data transfer processing element 23 transfers the black frame data to the frame data buffer 3.

The frame data buffer 3 stores the picture data transferred from the letter box conversion unit 2.

The graphic hardware 4 converts the picture data stored in the frame data buffer 3 into a signal capable of being displayed by the display unit 5. The graphic hardware 4 converts the picture data, for example, into an RGB signal. The graphic hardware 4 is a graphic hardware comprising an auxiliary processing unit. The graphic hardware 4 is, for example, a graphics-accelerator.

The graphic hardware 4 magnifies the picture data stored in the frame data buffer 3 3/2 times in the vertical direction according to an instruction of the central processing unit (letter box conversion unit 2). The graphic hardware 4 transmits the magnified picture data to the display unit 5.

The display unit 5 displays the picture data with an aspect ratio of 4:3. The display unit 5 is, for example, a monitor of a personal computer. The picture data with an aspect ratio of 4:3 is transmitted to the display unit 5 from the frame data buffer 3 through the graphic hardware 4.

Next, the operation of the embodiment will be described.

Figure 2:
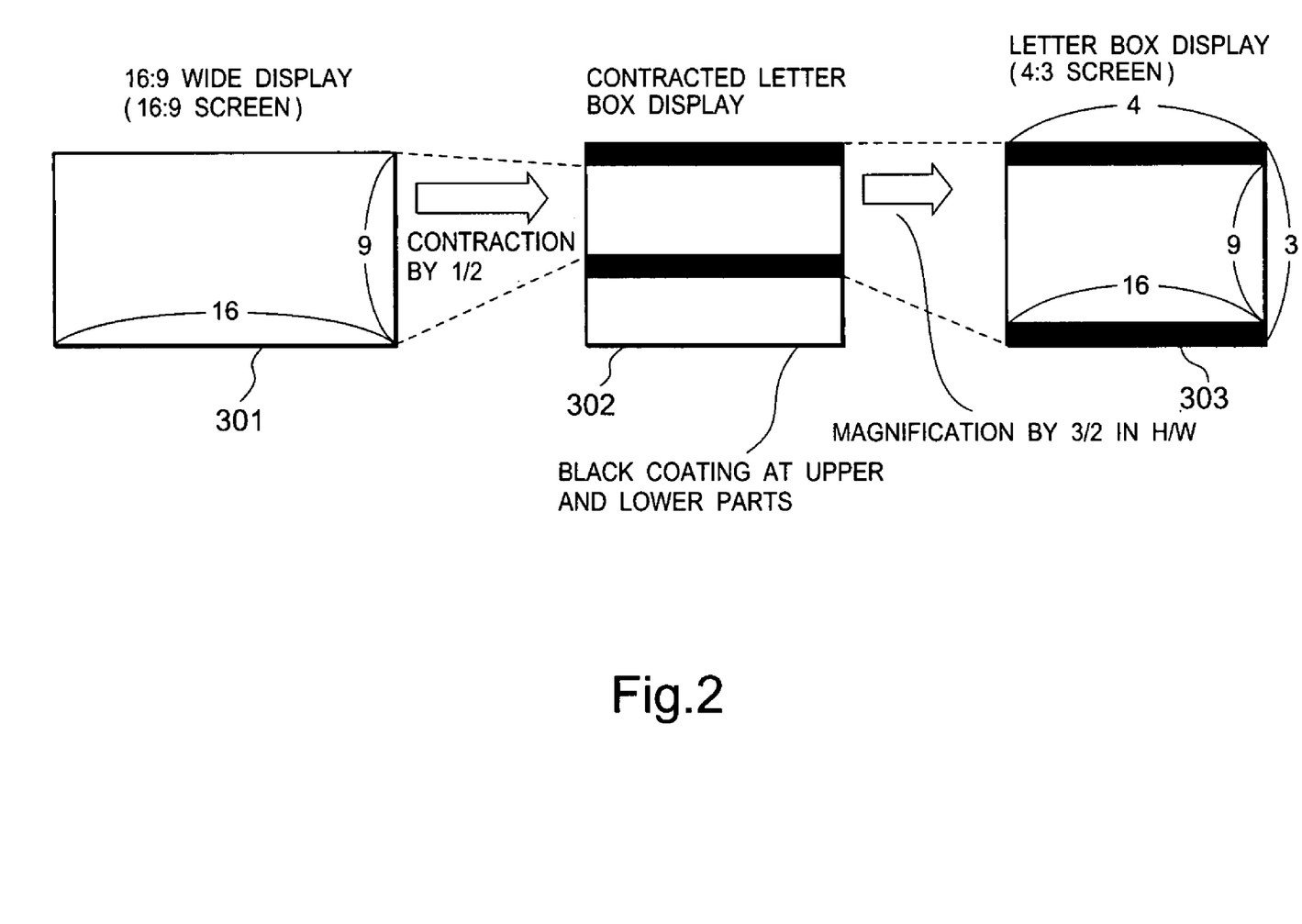
FIG. 2 is a drawing showing the outline of the processing of the letter box display of the present invention.

Referring to FIG. 2, a picture data 301 with an aspect ratio of 16:9 is displayed on a screen with an aspect ratio of 16:9. The picture data 301 is, for example, a picture data 11 stored in the original picture buffer 1.

A picture data 302 is created by the letter box conversion unit 2. The picture data 302 is a data made by contracting the picture data 301 by ½. Black frames are added above and below the picture data 302. The picture data 302 is transferred to the frame data buffer 3 by the letter box conversion unit 2.

A picture data 303 is created by the graphic hardware 4. The picture data 303 is obtained by magnifying the picture data 302 3/2 times. As shown in FIG. 2, the picture data 303 is displayed on a screen with an aspect ratio of 4:3.

Next, the description will be given by using concrete numerical values.

In the following description, a picture data 11 is stored in advance in the original picture buffer 1. Furthermore, the number of lines (horizontal scanning lines) of the original picture (picture data 11) is set to H (lines).

The picture data 11 outputted from the original picture buffer 1 is inputted into the upper black frame data transfer processing element 21 of the letter box conversion unit 2. The upper black frame data transfer processing element 21 recognizes that the number of lines of the picture data 11 is H (lines). The upper black frame data transfer processing element 21 creates a black frame data of $1/12 \times H$ (lines) corresponding to the upper black frame of the letter box display. The black frame data of $1/12 \times H$ (lines) is transferred to the frame data buffer 3 from the upper black frame data transfer processing element 21.

On the other hand, the inputted picture data 11 itself is not subjected to the data processing in the upper black frame data transfer processing element 21, but it is transferred to the picture data transfer processing element 22.

The picture data transfer processing element 22 processes the picture data 11 so that the number of lines of one frame may be decreased by ½. The picture data 11 is transferred to the frame data buffer 3 by the picture data transfer processing element 22. For example, in the case when the picture data 11 is interlace, the picture data transfer processing element 22 transfers only a first field (odd number field) or a second field (even number field) to the frame data buffer 3. Furthermore, in the case when the picture data 11 is non-interlace, the picture data transfer processing element 22 transfers every other line of the data of lines (horizontal scanning lines) to the frame data buffer 3.

The picture data transfer processing element 22 recognizes that the number of lines of the inputted picture data 11 is set to H (lines), and it transfers the number of lines (H) to the lower black frame data transfer processing element 23.

The lower black frame data transfer processing element 23 receives the number of lines (H) transferred from the picture data transfer processing element 22. The lower black frame data transfer processing element 23 creates a black frame data of $1/12 \times H$ (lines) corresponding to the lower black frame of the letter box display. The black frame data of $1/12 \times H$ (lines) is transferred to the frame data buffer 3 from the lower black frame data transfer processing element 23.

As a result of the fact that the data is respectively transferred from the upper black frame data transfer processing element 21, the picture data transfer processing element 22, and the lower black frame data transfer processing element 23, the frame data buffer 3 receives the frame data corresponding to one screen.

The frame data buffer 3 receiving the frame data corresponding to one screen stores the frame data as a picture data corresponding to one screen. The number of lines of the picture data corresponding to one screen is $8/12 \times H$ (lines).

Next, the graphic hardware 4 magnifies the picture data ($8/12 \times H$) stored in the frame data buffer 3 vertically 3/2 times, and it transmits the data to the display unit 5. The picture data magnified vertically 3/2 times becomes a picture data of the number of lines of H (lines). In case of making a letter box from the data of the number of lines of H, a video part becomes 3H/4 lines. By the way, the video part means the central part excluding the upper and lower black frames of the letter box.

The display unit 5 performs a display of the picture data magnified vertically 3/2 times. As shown in FIG. 2, at the stage of displaying a picture data (picture data in which the video part is only of the number of lines of 1/2×H (lines)) stored in the frame data buffer 3, the picture data is magnified vertically 3/2 times, so that a normal letter box display may be implemented.

Furthermore, as for each of the black frames coated at the upper and lower parts, 1/12×H (lines) which is two thirds of the normal number of lines of 1/8×H (lines) is transferred to the frame data buffer 3. Thus, by processing the picture data 11 for the letter box display according to the present invention, the amount of transfer of the picture data to be transferred to the frame data buffer 3 is decreased by 2/3 times. Consequently, the throughput required for transfer is reduced, and the load of the central processing unit (CPU) is decreased.

In the case where the picture data 11 is compressed by the MPEG2 system to be the data of the field structure, the data of lines of a vertical half can be implemented only by the decoding of one field. Therefore, the throughput required for the decoding of the data is decreased, so that the load of the central processing unit (CPU) can be reduced and the reproduction performance can be improved.

Furthermore, in the case when the picture data 11 is a picture of the interlace scanning system and the display is performed on a display (such as a display of a PC) of the sequential system, the scanning conversion processing for converting the interlace scanning into the sequential scanning has previously been required for preventing the degradation of the picture quality. In the method according to the present invention, since only the data of a vertical half is used, it is sufficient to use only the odd number field (data of odd number lines) or only the even number field (data of even number lines) in two fields of the interlace. Therefore, any time gap of the data between the fields (between the odd number line and the even number line) does not occur. Accordingly, the scanning conversion processing is unnecessary, so that the reproduction performance can further be improved.

Figure 3:
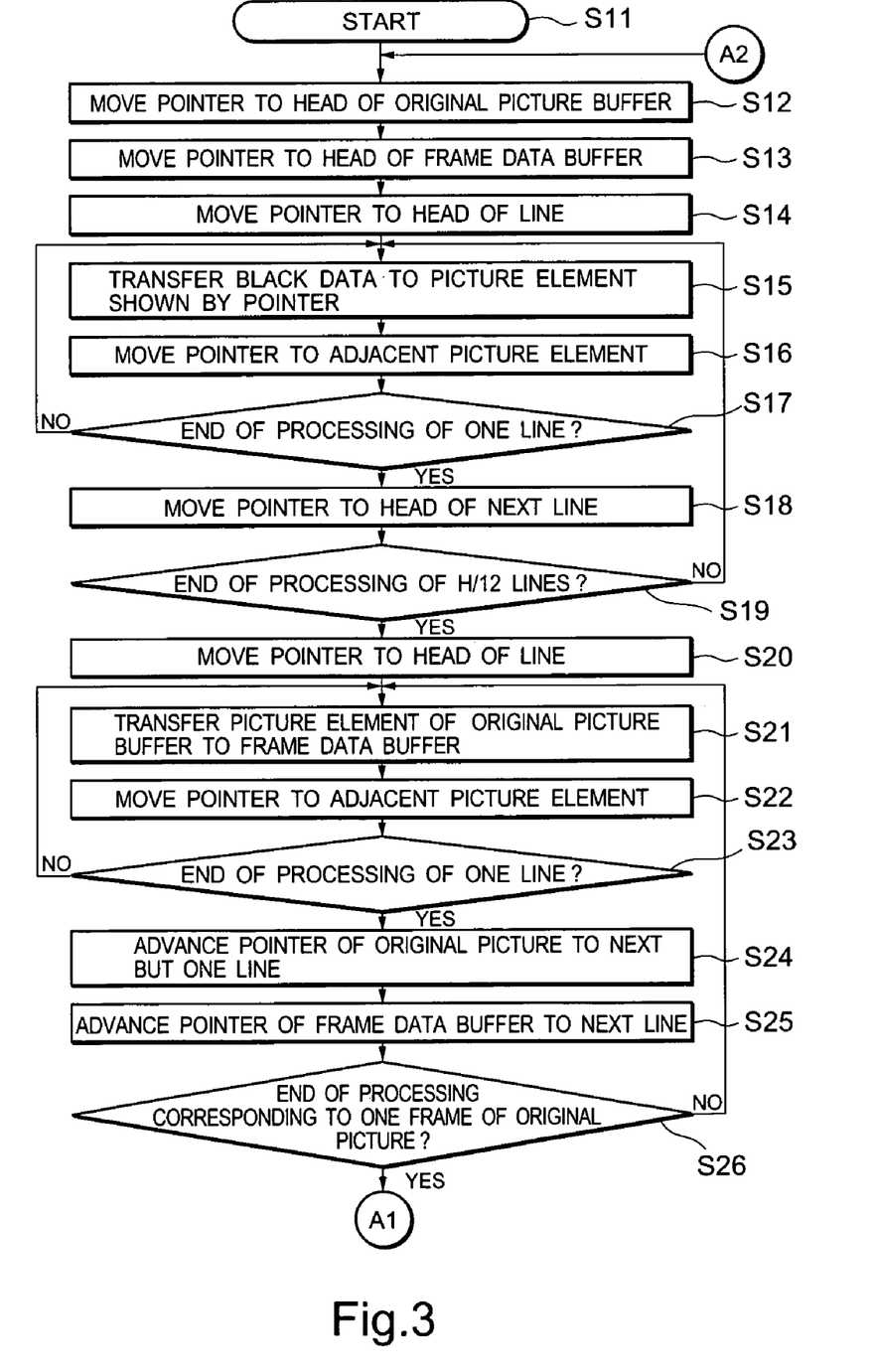
FIG. 3 is a drawing showing a flowchart of the scanning conversion processing of a letter box conversion unit 2 of the present invention.
Figure 4:
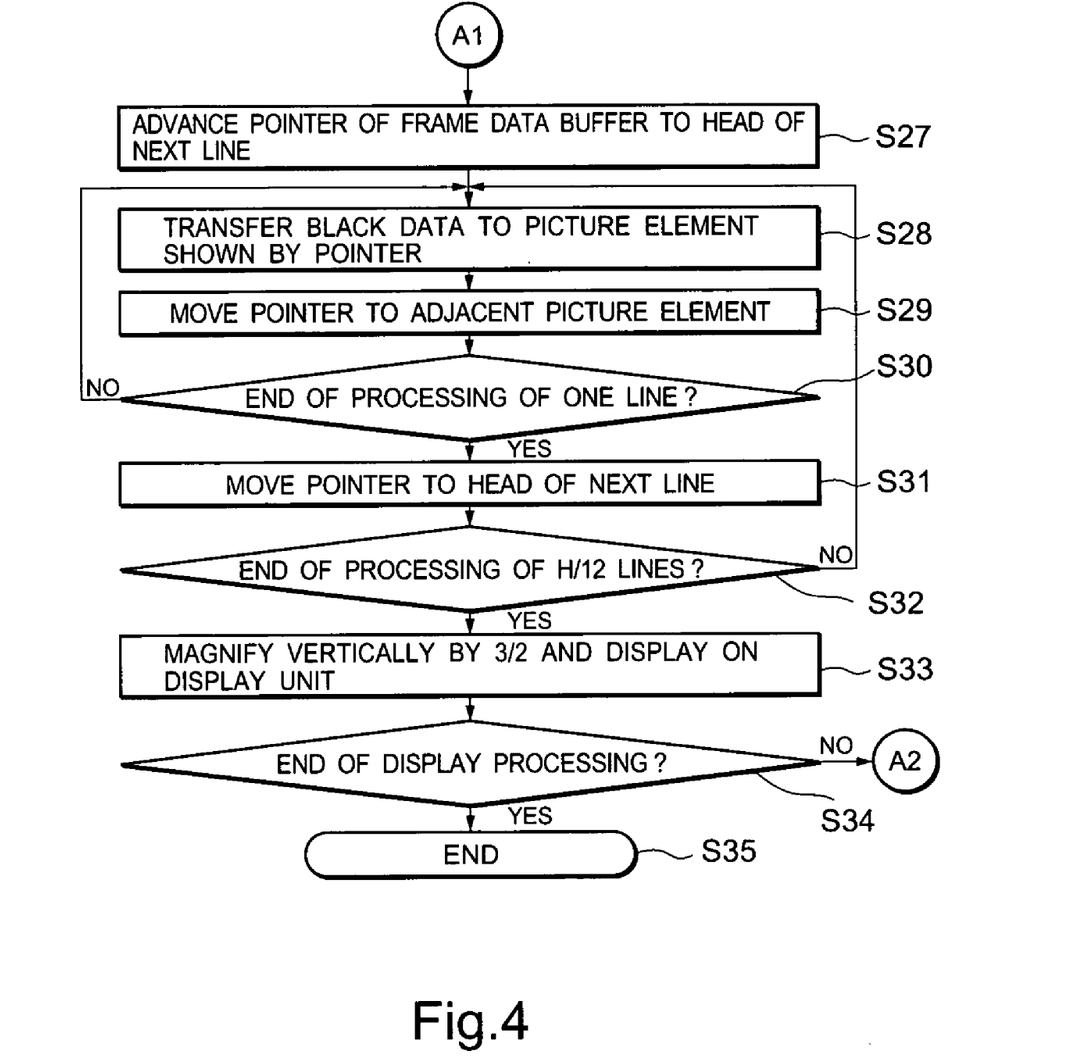
FIG. 4 is a drawing showing a flowchart of the scanning conversion processing of a letter box conversion unit 2 of the present invention.

Next, the scanning conversion processing of the letter box conversion unit 2 in the present embodiment will be more particularly described. A pointer a is a pointer of the original picture buffer 1. A pointer b is a pointer of the frame data buffer 3.

Referring to FIG. 3 and FIG. 4, the letter box conversion unit 2 starts the scanning conversion processing of the letter box display (step S11), and it moves the pointer a to the head of the original picture buffer 1 (step S12). At the step S13, the letter box conversion unit 2 moves the pointer b to the head of the frame data buffer 3. The letter box conversion unit 2 moves the pointer b to the head of the line (step S14).

At the step S15, the upper black frame data transfer processing element 21 transfers the black data to the picture element of the frame data buffer 3 shown by the pointer b. The letter box conversion unit 2 moves the pointer b to the picture element adjacent to the present picture element (step S16).

At the step S17, the upper black frame data transfer processing element 21 judges whether the processing (transfer of the black data) corresponding to one line has ended or not. In the case when the processing corresponding to one line has not ended, the upper black frame data transfer processing element 21 moves to the processing of the step S15.

As a result of the judgment of the step S17, in the case when the processing (transfer of the black data) corresponding to one line has ended, the upper black frame data transfer processing element 21 moves the pointer b to the head of the next line (step S18).

At the step S19, the upper black frame data transfer processing element 21 judges whether the transfer of the black data corresponding to 1/12×H lines has ended or not. In the case when the transfer of the black data corresponding to 1/12×H lines has not ended, the upper black frame data transfer processing element 21 moves to the processing of the step S15.

As a result of the judgment of the step S19, in the case when the transfer of the black data corresponding to 1/12×H lines has ended, the letter box conversion unit 2 moves both the pointer a of the original picture buffer 1 and the pointer b of the frame data buffer 3 to the heads of the lines, respectively (step S20).

At the step S21, the picture data transfer processing element 22 transfers the data shown by the pointer a of the original picture buffer 1 to the picture element shown by the pointer b of the frame data buffer 3. The picture data transfer processing element 22 respectively moves the pointer a of the original picture buffer 1 and the pointer b of the frame data buffer 3 to the adjacent picture elements (step S22).

At the step S23, the picture data transfer processing element 22 judges whether the processing (transfer of the data shown by the pointer a of the original picture buffer 1 to the picture element shown by the pointer b of the frame data buffer 3) corresponding to one line has ended or not. In the case when the processing corresponding to one line has not ended, the picture data transfer processing element 22 moves to the processing of the step S21.

As a result of the judgment of the step S23, in the case when the processing corresponding to one line has ended, the picture data transfer processing element 22 moves the pointer a of the original picture buffer 1 to the next but one line of the present line (step S24).

At the step S25, the pointer b of the frame data buffer 3 is moved to the next line.

At the step S26, the picture data transfer processing element 22 judges whether the processing corresponding to one frame of the original picture buffer 1 has ended or not. In the case when the processing corresponding to one frame has not ended, the picture data transfer processing element 22 moves to the processing of the step S21.

As a result of the judgment of the step S26, in the case when the processing corresponding to one frame has ended, the picture data transfer processing element 22 moves the pointer b of the frame data buffer 3 to the head of the line (step S27).

At the step S28, the lower black frame data transfer processing element 23 transfers the black data to the picture element of the frame data buffer 3 shown by the pointer b. The lower black frame data transfer processing element 23 moves the pointer b to the picture element adjacent to the present picture element (step S29).

At the step S30, the lower black frame data transfer processing element 23 judges whether the processing (transfer of the black data) corresponding to one line has ended or not. In the case when the processing corresponding to one line has not ended, the lower black frame data transfer processing element 23 moves to the processing of the step S28.

As a result of the judgment of the step S30, in the case when the processing (transfer of the black data) corresponding to one line has ended, the lower black frame data transfer processing element 23 moves the pointer b to the head of the next line (step S31).

At the step S32, the lower black frame data transfer processing element 23 judges whether the transfer of the black data corresponding to $\frac{1}{12} \times H$ lines has ended or not. In the case when the transfer of the black data corresponding to $\frac{1}{12} \times H$ lines has not ended, the lower black frame data transfer processing element 23 moves to the processing of the step S28.

As a result of the judgment of the step S32, in the case when the transfer of the black data corresponding to $\frac{1}{12} \times H$ lines has ended, the letter box conversion unit 2 makes the graphic hardware 4 magnify the data transferred by the above processing to the frame data buffer 3 vertically $\frac{3}{2}$ times, and it makes the display unit 5 display the data (step S33).

At the step S34, the letter box conversion unit 2 judges whether the display processing has ended (for example, in the case where all picture data of the original picture buffer 11 is displayed) or not. In the case when the display processing has not ended, the letter box conversion unit 2 moves to the processing of the step S12.

As a result of the judgment of the step S34, in the case when the display processing has ended, the letter box conversion unit 2 ends the processing (step S35).

Next, a second embodiment of the present invention will be described.

In the present embodiment, means is proposed, in which the load of the central processing unit (CPU) is further decreased to improve the reproduction performance in the letter box display of the first embodiment. By the way, when other embodiments are described, the description of the parts similar to those of the present embodiment will be omitted, and the different parts will be described.

Figure 5:
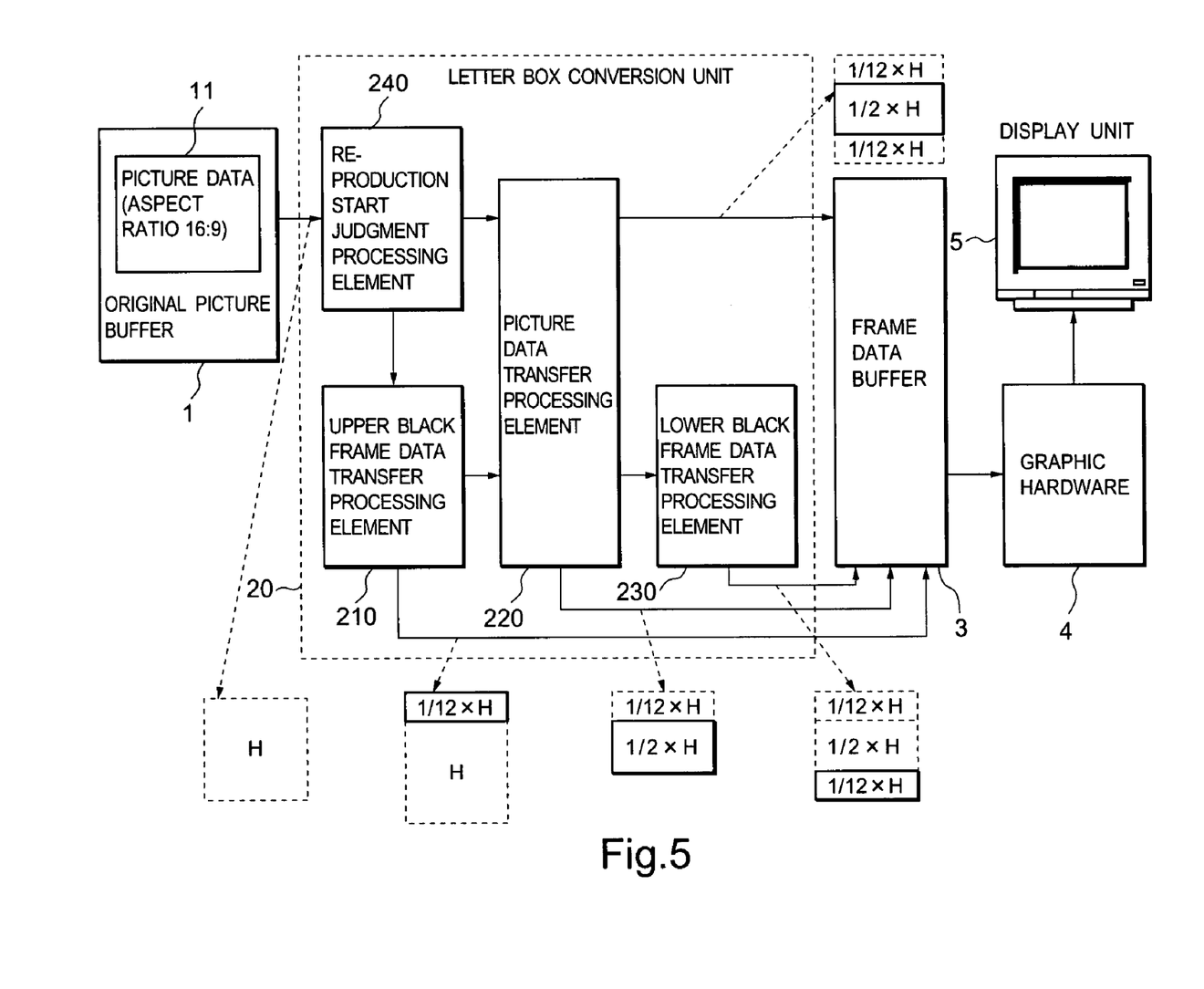
FIG. 5 is a block diagram of a second embodiment of the present invention.

Referring to FIG. 5, an image display system of the present embodiment comprises an original picture buffer 1 which stores a picture signal with an aspect ratio of 16:9, a letter box conversion unit 20 which converts the picture data into the letter box format, a frame data buffer 3 which stores the picture data to be displayed, a graphic hardware 4 which magnifies the picture data vertically $\frac{3}{2}$ times, and a display unit 5 which actually displays the picture.

The original picture buffer 1 stores an aspect ratio 16:9 picture data 11 with an aspect ratio of 16:9.

Similarly to the first embodiment, the letter box conversion unit 20 comprises an upper black frame data transfer processing element 210 which transfers the data of a black frame on the upper side, a picture data transfer processing element 220 which transfers the data of an original picture at the center, and a lower black frame data transfer processing element 230 which transfers the data of a black frame on the lower side. The letter box conversion unit 2 comprises a reproduction start judgment processing element 240 which judges that the frame is a reproduction start frame.

Next, the operation of the present embodiment will be described.

The data of the black of the upper and lower frames and the picture data at the center are transferred to the frame data buffer 3 for each frame. The data of the black of the upper and lower parts does not change during the reproduction, but it displays the black at all times. Accordingly, as for the parts of the upper and lower frames of the frame data buffer 3, it is sufficient to transfer the data of the black only at the time of reproduction start. The reproduction start judgment processing element 240 judges whether the frame is a reproduction start frame. In the case when the frame is a reproduction start frame, the letter box conversion unit 20 transfers the data of the black of the upper and lower frames and the picture data at the center to the frame data buffer 3.

As a result of the judgment in the reproduction start judgment processing element 240, in the case when the frame is not a reproduction start frame, the letter box conversion unit 20 transfers only the picture data at the center to the frame data buffer 3.

In the case when the frame data buffer 3 has a plurality of pieces of frame buffers, it transfers the black to the frames corresponding to the number of pieces of the frame data buffers at the time of reproduction start, and after that, it transfers only the picture data at the center.

Figure 6:
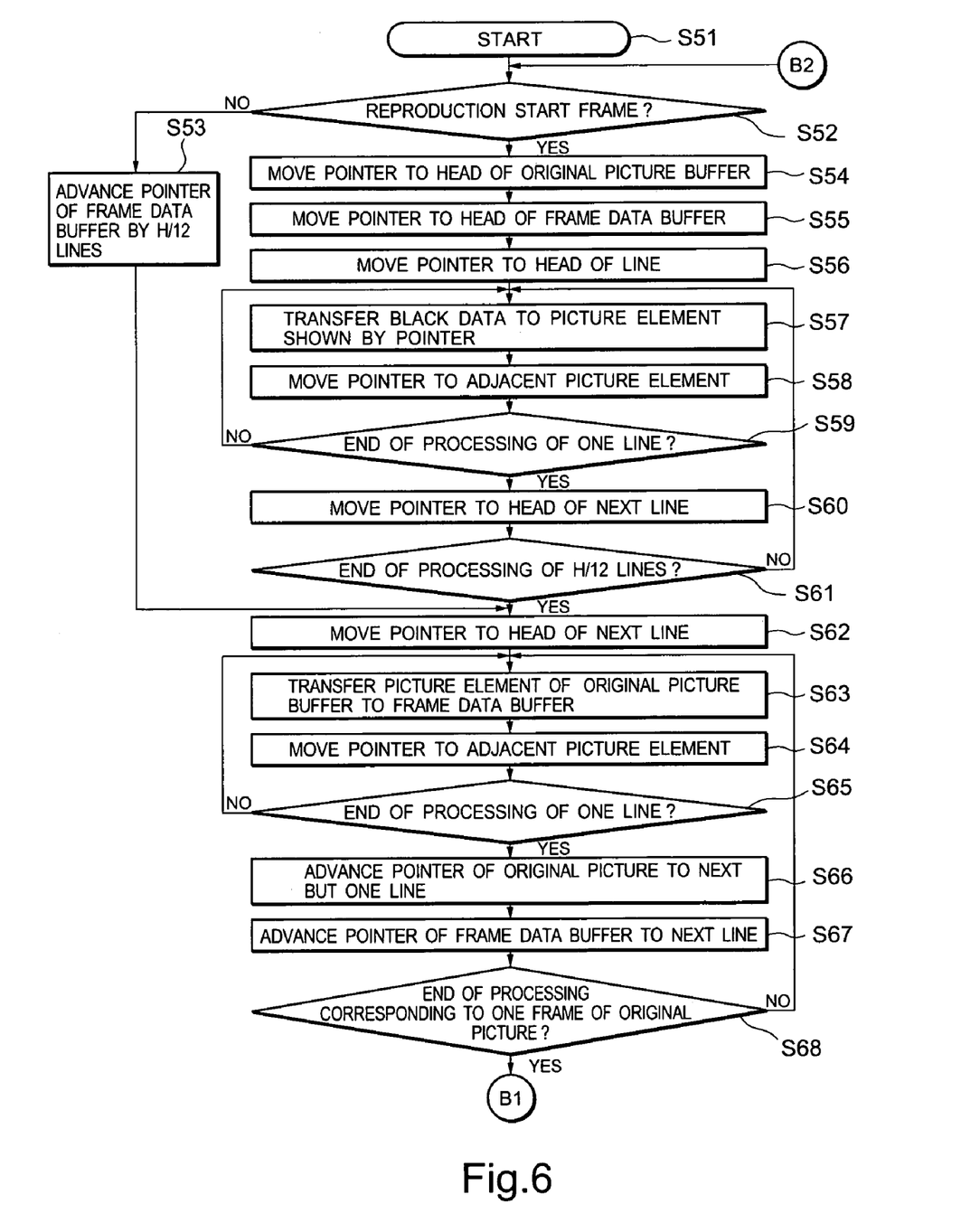
FIG. 6 is a drawing showing a flowchart of a picture magnification method using the composite processing of a letter box conversion unit 2 of the second embodiment of the present invention.
Figure 7:
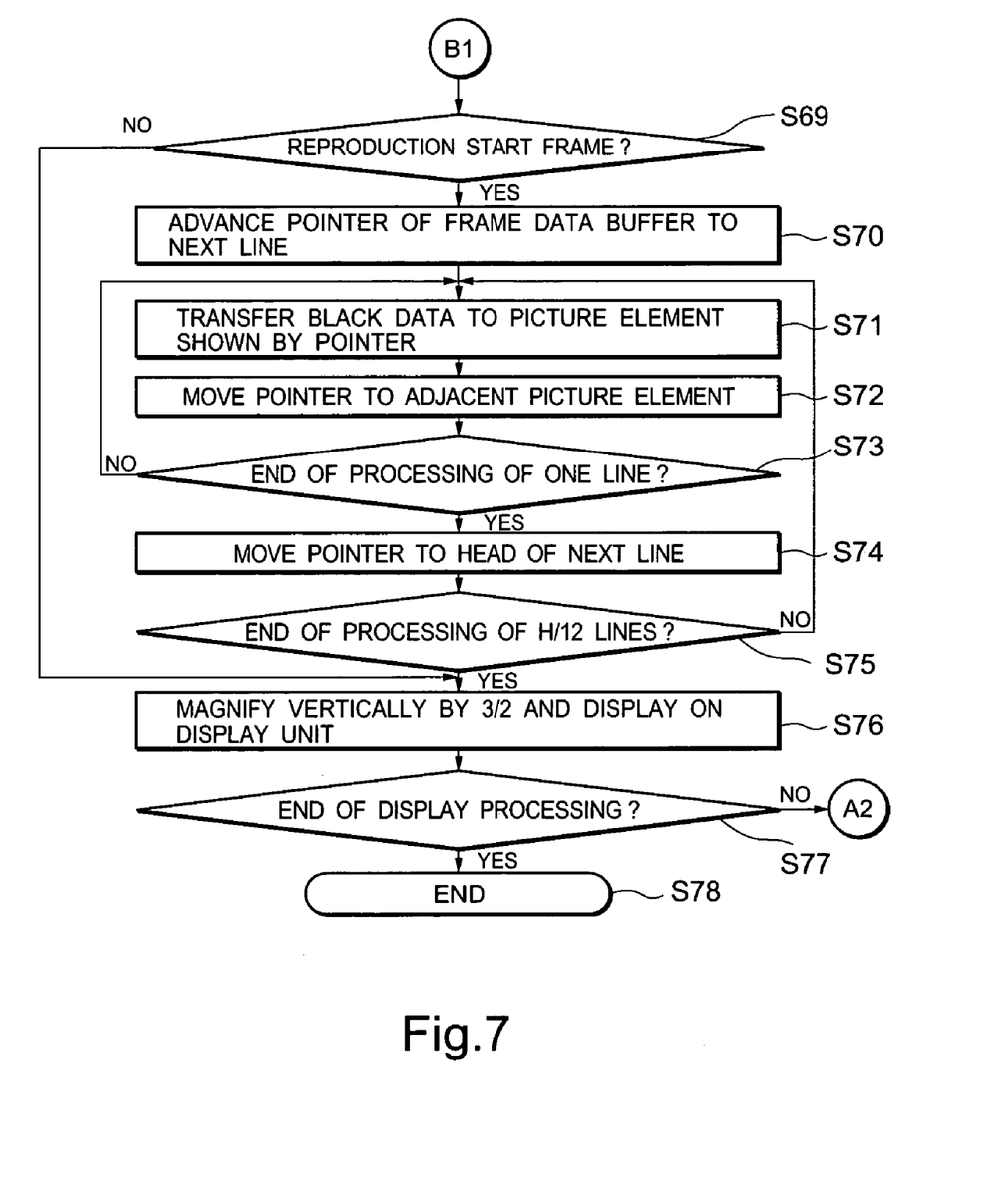
FIG. 7 is a drawing showing a flowchart of a picture magnification method using the composite processing of the letter box conversion unit 2 of the second embodiment of the present invention.

Next, by referring to FIG. 6 and FIG. 7, a flowchart of the picture magnification method using the composite processing of the letter box conversion unit 2 in the present embodiment will be described.

The letter box conversion unit 2 starts the display of a picture by the composite processing (step S51). At the step S52, the reproduction start judgment processing element 240 judges whether the frame to be processed from now is a reproduction start frame (first frame to be reproduced) or not.

As a result of the judgment of the step S52, in the case where the frame to be processed from now is not a reproduction start frame, the reproduction start judgment processing element 240 advances the pointer b of the frame data buffer 3 by an amount corresponding to $\frac{1}{12} \times H$ lines (step S53), and it moves to the step S62 to be described later.

As a result of the judgment of the step S52, in the case where the frame to be processed from now is a reproduction start frame, the reproduction start judgment processing element 240 moves the pointer a to the head of the original picture buffer 1 (step S54).

At the step S55, the reproduction start judgment processing element 240 moves the pointer b to the head of the frame data buffer 3. The reproduction start judgment processing element 240 moves the pointer b to the head of the line (step S56).

At the step S57, the upper black frame data transfer processing element 210 transfers the black data to the picture element of the frame data buffer 3 shown by the pointer b. The upper black frame data transfer processing element 210 moves the pointer 1 to the picture element adjacent to the present picture element (step S58).

At the step S59, the upper black frame data transfer processing element 210 judges whether the processing (transfer of the black data) corresponding to one line has ended or not. In the case where the processing corresponding to one line has not ended, the upper black frame data transfer processing element 210 moves to the processing of the step S57.

As a result of the judgment of the step S59, in the case where the processing (transfer of the black data) corresponding to one line has ended, the upper black frame data transfer processing element 210 moves the pointer b to the head of the next line (step S60).

At the step S61, the upper black frame data transfer processing element 210 judges whether the transfer of the black data corresponding to $\frac{1}{12} \times H$ lines has ended or not. In the case where the transfer of the black data corresponding to $\frac{1}{12} \times H$ lines has not ended, the upper black frame data transfer processing element 210 moves to the processing of the step S57.

As a result of the judgment of the step S61, in the case where the transfer of the black data corresponding to $\frac{1}{12} \times H$ lines has ended, the upper black frame data transfer processing element 210 moves both the pointer a of the original picture buffer 1 and the pointer b of the frame data buffer 3 respectively to the heads of the lines (step S62).

At the step S63, the picture data transfer processing element 220 transfers the data shown by the pointer a of the original picture buffer 1 to the picture element shown by the pointer b of the frame data buffer 3. The picture data transfer processing element 220 moves the pointer a of the original picture buffer 1 and the pointer b of the frame data buffer 3 respectively to the picture elements adjacent to the present picture elements (step S64).

At the step S65, the processing (transfer of the data shown by the pointer a of the original picture buffer 1 to the picture element shown by the pointer b of the frame data buffer 3) corresponding to one line has ended or not. In the case where the processing corresponding to one line has not ended, the picture data transfer processing element 220 moves to the processing of the step S63.

As a result of the judgment of the step S65, in the case where the processing corresponding to one line has ended, the picture data transfer processing element 220 moves the pointer a of the original picture buffer 1 to the next but one line of the present line (step S66). At the step S67, the picture data transfer processing element 220 moves the pointer b of the frame data buffer 3 to the next line.

At the step S68, whether the processing corresponding to one frame of the original picture buffer 1 has ended or not is judged. In the case where the processing corresponding to one frame has not ended, the picture data transfer processing element 220 moves to the processing of the step S63.

Next, the reproduction start judgment processing element 240 judges whether the frame to be processed from now is a reproduction start frame (first frame to be reproduced) or not (step S69).

As a result of the judgment of the step S69, in the case where the frame to be processed from now is not a reproduction start frame, the reproduction start judgment processing element 240 moves to the processing of the step S76 to be described later.

As a result of the judgment of the step S69, in the case where the frame to be processed from now is a reproduction start frame, the reproduction start judgment processing element 240 moves the pointer b of the frame data buffer 3 to the head of the next line (step S70).

At the step S71, the lower black frame data transfer processing element 230 transfers the black data to the picture element of the frame data buffer 3 shown by the pointer b. The lower black frame data transfer processing element 230 moves the pointer b to the picture element adjacent to the present picture element (step S72).

At the step S73, the lower black frame data transfer processing element 230 judges whether the processing (transfer of the black data) corresponding to one line has ended or not. In the case where the processing corresponding to one line has not ended, the lower black frame data transfer processing element 230 moves to the processing of the step S71.

As a result of the judgment of the step S73, in the case where the processing (transfer of the black data) corresponding to one line has ended, the lower black frame data transfer processing element 230 moves the pointer b to the head of the next line (step S74).

At the step S75, the lower black frame data transfer processing element 230 judges whether the transfer of the black data corresponding to $\frac{1}{12} \times H$ lines has ended or not. In the case where the transfer of the black data corresponding to $\frac{1}{12} \times H$ lines has not ended, the lower black frame data transfer processing element 230 moves to the processing of the step S71.

As a result of the judgment of the step S75, in the case where the transfer of the black data corresponding to $\frac{1}{12} \times H$ lines has ended, the letter box conversion unit 20 makes the graphic hardware 4 magnify the data transferred by the above processing to the frame data buffer 3 vertically $\frac{3}{2}$ times, and makes the display unit 5 display the data (step S76).

At the step S77, the letter box conversion unit 20 judges whether the display processing has ended (for example, in the case where all picture data of the original picture buffer 1 is displayed) or not. In the case where the display processing has not ended, the letter box conversion unit 20 moves to the processing of the step S52.

As a result of the judgment of the step S77, in the case where the display processing has ended, the letter box conversion unit 20 ends the processing (step S78).

Thus, in the present embodiment, the transfer of the data of the upper and lower black frame parts is omitted, and therefore, in the case when the processing is performed by a software, the load of the central processing unit (CPU) is reduced so that the reproduction performance may be improved.

As described above, in the image display unit, system, or method of the present invention, the letter box display is performed not by the contraction of the data of one frame but by the magnification of the picture data (signal) of the lines of a vertical half. The amount of the data transfer is reduced and the load of the central processing unit (CPU) is decreased. According to the present invention, the letter box display can be performed at a high speed.

According to the image display unit, system, and method of the present invention, in the case when the data of the interlace scanning is displayed on a display of the sequential scanning, the scanning conversion processing is unnecessary. The reason is that in the case of a picture signal of the interlace scanning, the data of a vertical half is configured by the data of a first field and therefore, it is sufficient to use only the data of a first field and it is unnecessary to simultaneously display the data of different fields.

According to the image display unit, system, and method of the present invention, in the case where the original picture is compressed by the field structure of the MPEG2 system, the display can be performed by the decoding processing of only one field. The reason is that the picture data of a vertical half can be obtained only by the decoding of one field.

While this invention has been described in conjunction with the preferred embodiments described above, it will now be possible for those skilled in the art to put this invention into practice in various other manners.

What is claimed is:

1. A picture convert apparatus comprising:
a CPU which inputs a first picture data, produces a second picture data consisting of a first black area, a second black area and an area consisting of a reduced number of lines of said first picture, the reduced number of lines being half a number of lines of the first picture, and transfers said second picture data to a frame data buffer;
an auxiliary processing unit which inputs said second picture data from said frame data buffer and enlarges said second picture data to provide an enlarged picture, the enlarged picture being enlarged $\frac{3}{2}$ times relative to the second picture data in the vertical direction; and
an element which displays said enlarged picture, and
wherein said first picture data has a first aspect ratio, and said enlarged picture has a second aspect ratio which is different from said first aspect ratio, and wherein said area consisting of the reduced number of lines is sandwiched between said first black area and said second black area, wherein said first aspect ratio is 16:9 and said second aspect ratio is 4:3.

2. The picture convert apparatus as claimed in claim 1, wherein said CPU produces said second picture data by using one field out of two of said first picture data when said first picture data is compressed by a MPEG2 format.

3. The picture convert apparatus as claimed in claim 1, wherein said CPU produces said second picture data by using one field out of two of said first picture data when said first picture data is an interlace scanning format.

4. A picture convert apparatus comprising:
a CPU which produces a first black area, reduces the line number of a picture data to a predetermined line number, the predetermined line number being half the line number of the picture data, produces a second black area, forms said first black area, said reduced number of lines and said second black area to a frame and transfers said frame to a frame buffer;
an auxiliary processing unit which inputs said frame from said frame buffer and enlarges said frame, the enlarged frame being enlarged 3/2 times relative to the frame in the vertical direction; and
an element which displays said enlarged frame, and
wherein said picture data has a first aspect ratio, and said enlarged frame has a second aspect ratio which is different from said first aspect ratio, and wherein said reduced number of lines is sandwiched between said first black area and said second black area, wherein said first aspect ratio is 16:9 and said second aspect ratio is 4:3.

5. The picture convert apparatus as claimed in claim 4, wherein said CPU produces said first and second black area when the present frame is a start frame.

6. The picture convert apparatus as claimed in claim 5, further comprising an element which determines whether or not the present frame is a start frame.

7. The picture convert apparatus as claimed in claim 4, wherein said CPU forms said frame by using said reduced numbers of lines of each picture data and said first and second black area of a start frame unless the present frame is said start frame.

8. A method for converting a first picture data to a second picture data, comprising:
producing a first black area by a CPU;
reducing the line number of said first picture data to a predetermined line number by said CPU, the predetermined line number being half the line number of the picture data;
producing a second black area by said CPU;
forming said first black area, said reduced number of lines and said second black area to a frame by said CPU;
transferring said frame to a frame buffer by said CPU;
inputting said frame from said frame buffer by an auxiliary processing unit;
enlarging said frame by said auxiliary processing unit, the enlarged frame being enlarged 3/2 times relative to the frame in the vertical direction; and
displaying said enlarged frame on a display, and
wherein said first picture data has a first aspect ratio, and said enlarged frame has a second aspect ratio which is different from said first aspect ratio, and wherein said reduced number of lines is sandwiched between said first black area and said second black area, wherein said first aspect ratio is 16:9 and said second aspect ratio is 4:3.

* * * * *